(12) United States Patent
Morton

(10) Patent No.: US 6,954,989 B1
(45) Date of Patent: Oct. 18, 2005

(54) DOOR OPERATING HARDWARE INSTALLATION GUIDE

(75) Inventor: Lane M. Morton, Greensboro, NC (US)

(73) Assignee: Kennametal Inc., Latrobe, PA (US)

( * ) Notice: Subject to any disclaimer, the term of this patent is extended or adjusted under 35 U.S.C. 154(b) by 0 days.

(21) Appl. No.: 10/811,567

(22) Filed: Mar. 29, 2004

(51) Int. Cl.$^7$ ............................ B23B 47/28; G01B 3/14
(52) U.S. Cl. ...................................... 33/194; 408/72 R
(58) Field of Search ........................ 33/194, 197, 562, 33/566, 374, 613, 645; 408/72 R

(56) References Cited

U.S. PATENT DOCUMENTS

| | | | |
|---|---|---|---|
| 2,675,626 A * | 4/1954 | Boatwright | 33/197 |
| 3,104,477 A * | 9/1963 | Edwill | 33/374 |
| 3,789,892 A | 2/1974 | Converse et al. | |
| 4,199,060 A | 4/1980 | Howard | |
| 4,257,166 A | 3/1981 | Barker et al. | |
| 4,280,776 A | 7/1981 | Chaconas et al. | |
| 4,306,823 A | 12/1981 | Nashlund | |
| 4,447,176 A | 5/1984 | Blough et al. | |
| 4,715,125 A | 12/1987 | Livick | |
| 4,813,826 A * | 3/1989 | Riedel | 33/197 |
| 5,114,285 A | 5/1992 | Brydon | |
| 5,146,961 A | 9/1992 | Schoeller | |
| 5,279,343 A | 1/1994 | Woods | |
| 5,479,802 A | 1/1996 | Miller | |
| 5,569,001 A | 10/1996 | Brutscher et al. | |
| 5,947,656 A | 9/1999 | Simson et al. | |
| 6,109,839 A | 8/2000 | Thomas | |
| 6,116,831 A | 9/2000 | Simson et al. | |
| H1887 H | 10/2000 | Fuller | |
| 6,193,449 B1 | 2/2001 | Diaz | |
| 6,390,738 B1 | 5/2002 | Fridman | |
| 2002/0121025 A1 * | 9/2002 | Leite | 33/374 |
| 2004/0020809 A1 | 2/2004 | Allen et al. | |

* cited by examiner

Primary Examiner—Christopher W. Fulton
(74) Attorney, Agent, or Firm—Larry R. Meenan

(57) ABSTRACT

A door operating hardware installation guide for preparing a door for the mounting of operating hardware. The guide includes a front template and a side template. The front template includes a first side and a second side and the side template includes a first side and a second side. The side template is operatively, removably coupled to the front template. The front template and the side template have a plurality of through guide holes defining the outer perimeter of proposed mounting holes for the operating hardware. The accurate placement of the mounting holes in the door is facilitated by the through guide holes when either the first side or the second side of the front template is in contact with the edge of the door and either the first side or the second side of the side template is in contact with the side of the door.

10 Claims, 4 Drawing Sheets

DOOR OPERATING HARDWARE INSTALLATION GUIDE

BACKGROUND OF THE INVENTION

1. Field of the Invention

This invention relates to a door operating hardware installation guide. More particularly, this invention relates to an installation guide to accurately position, align and guide a hole saw when boring holes into a hinged door for installation of door operating hardware.

2. Description of the Related Art

A wide variety of door operating hardware, such as doorknobs and locksets, is available for mounting on doors. Such door operating hardware requires installation onto the door, usually with the use of through bolts that engage mounting plates on either side. This type of installation typically requires through holes to accept the mounting bolts, and other holes or recesses to accept other working parts of the operating hardware.

Manufacturers of door operating hardware generally include an inexpensive paper template with the hardware that helps the installer to position and align the mounting holes correctly on the door. Clearly these manufactures, striving to reduce the cost of the operating hardware package and working under the assumption that the template will be used only once, are not concerned with the durability of these templates. Therefore the paper template is flimsy, making it difficult to work with, is inefficient, requiring layout and adjustment time, does not provide a physical guide way for piercing tools and must be transferred from one side of the door to the other side. For a detailed discussion of various methods and templates, reference is made to U.S. Pat. Nos. 5,114,285; 4,715,125; 4,306,823; 4,280,776; 4,199,060; 3,789,892; 6,390,738; 6,116,831; 6,193,449; 5,947,656; 5,479,802; 5,569,001 and Invention Registration H1,887; incorporated herein by reference.

Although the known templates may, at times, perform satisfactorily, further improvements on door operating hardware installation guides are desired.

SUMMARY OF THE INVENTION

Briefly, according to this invention, there is provided a door operating hardware installation guide for preparing a door for the mounting of operating hardware. The guide includes a front template and a side template. The front template includes a first side and a second side and the side template includes a first side and a second side. The side template is operatively, removably coupled to the front template. The front template and the side template have a plurality of through guide holes defining the outer perimeter of proposed mounting holes for the operating hardware. The accurate placement of the mounting holes in the door is facilitated by the through guide holes when either the first side or the second side of the front template is in contact with the edge of the door and either the first side or the second side of the side template is in contact with the side of the door.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
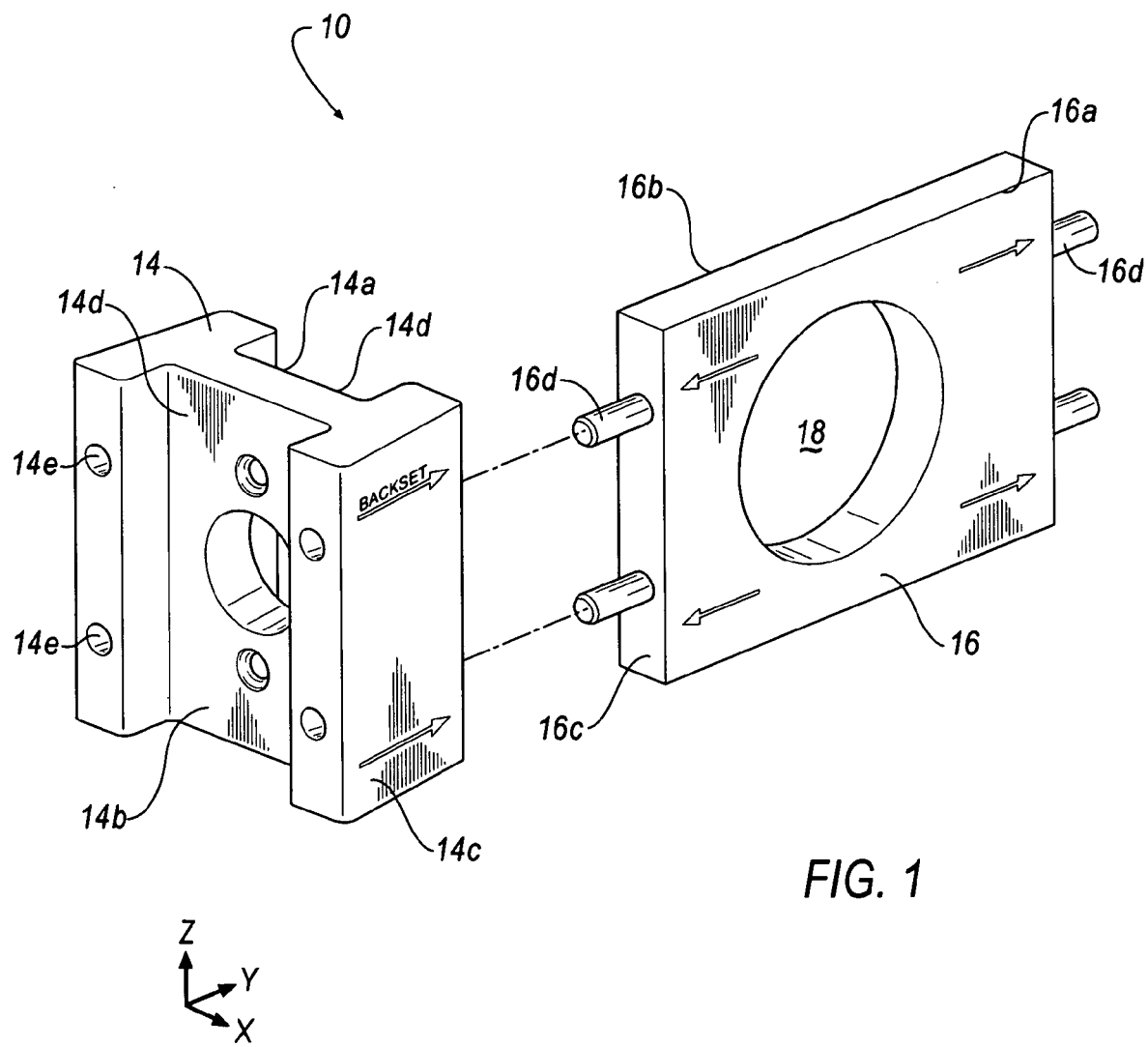
FIG. 1 is an exploded perspective view of the door operating hardware installation guide in accordance with the present invention.

Referring to the drawings, wherein like reference characters represent like elements, there is shown a door operating hardware installation guide 10 for preparing a door 12 for the mounting of operating hardware (not shown). The operating hardware may include, for example, doorknobs and locksets and the like as well known in the art.

The installation guide 10 includes a front template 14 and a side template 16. The front template 14 and the side template 16 have a plurality of through guide holes 18. The through guide holes 18 define the outer perimeter of proposed mounting holes and accurately position, align and guide a hole saw for boring the mounting holes to receive the operating hardware. It will be appreciated that the size and shape of the through guide holes 18 may vary in size and location and the resulting mounting holes as desired to accommodate the specific operating hardware.

Figure 2:
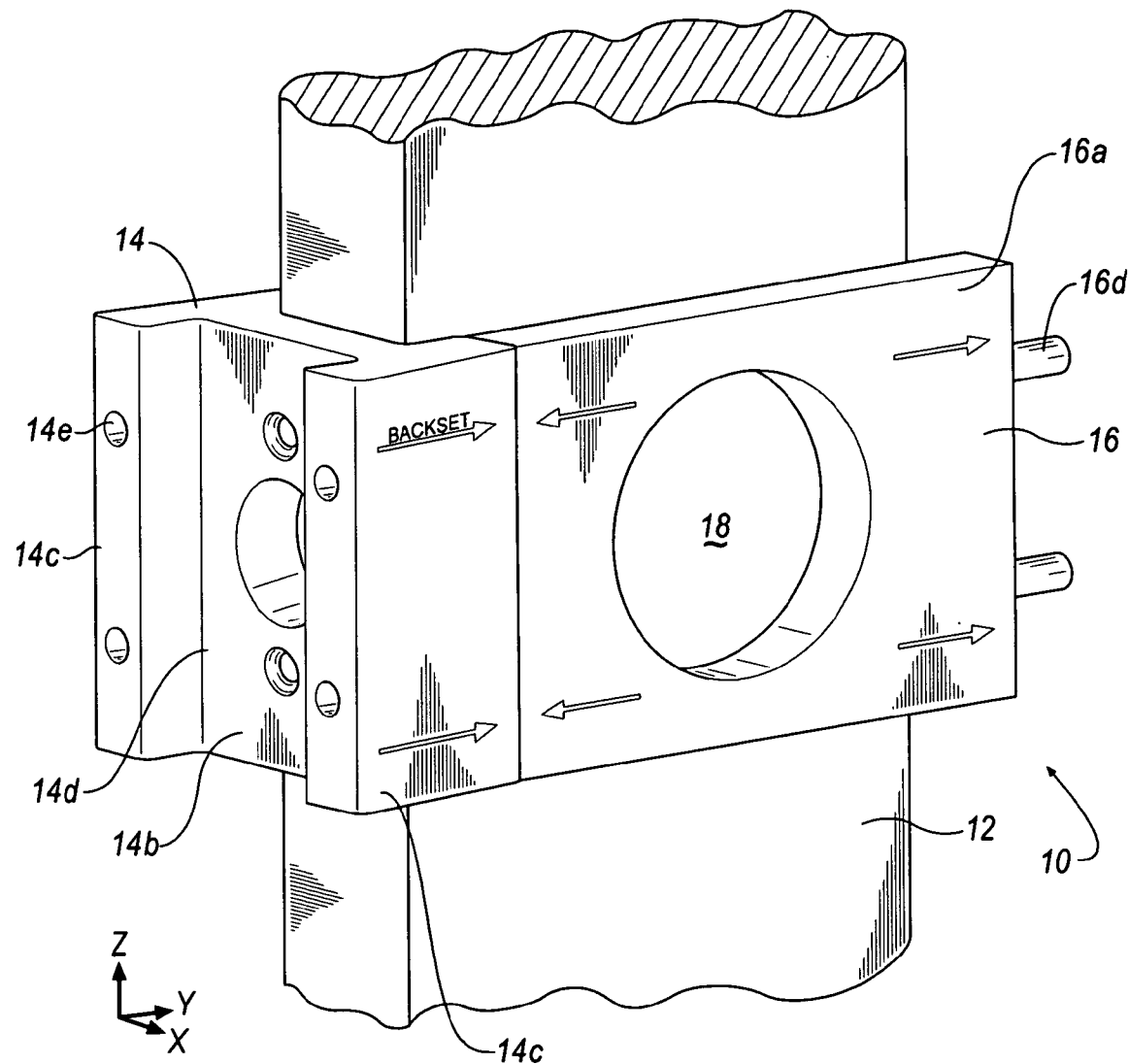
FIG. 2 is perspective view of the door operating hardware installation guide in accordance with the present invention.
Figure 3:
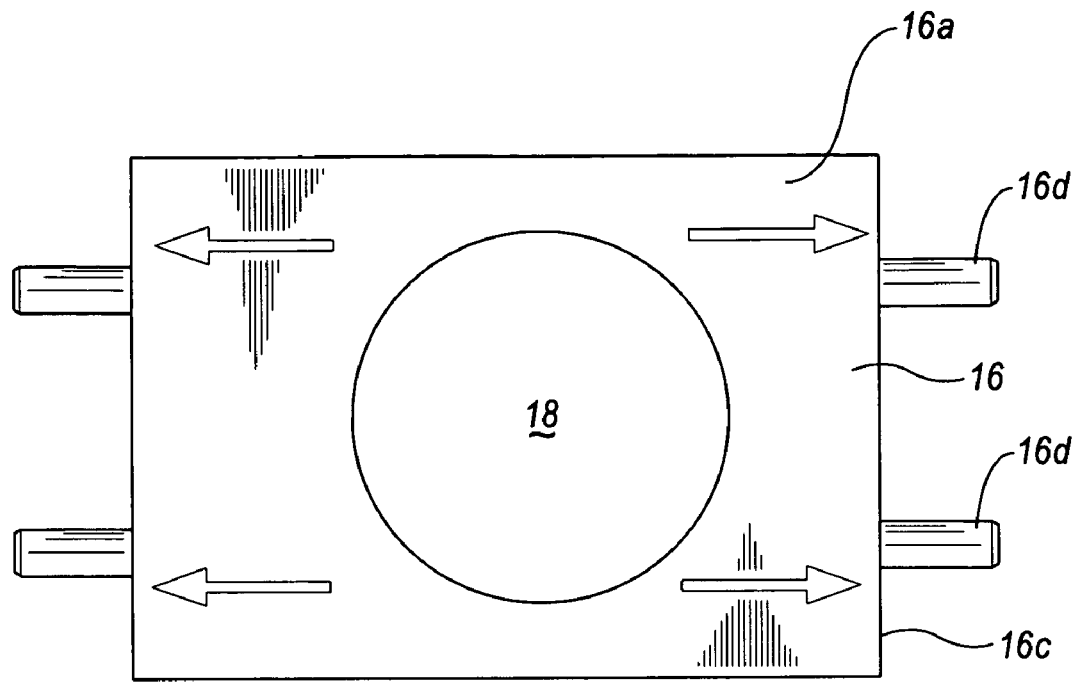
FIG. 3 is a side view of a side template of the door operating hardware installation guide of FIG. 1.
Figure 4:
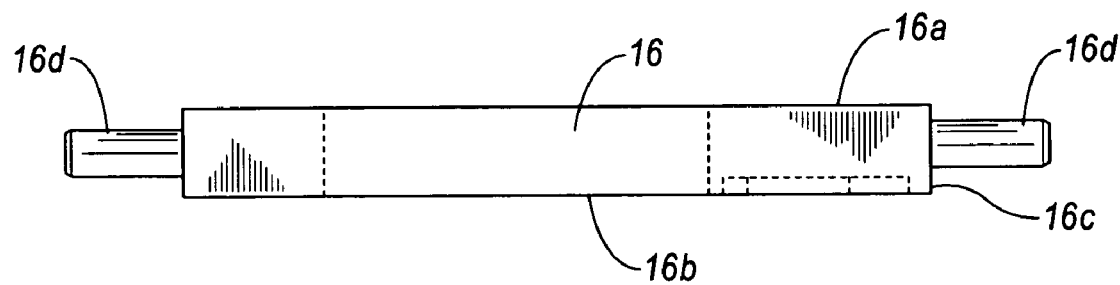
FIG. 4 is an end view of the side template of FIG. 3.
Figure 5:
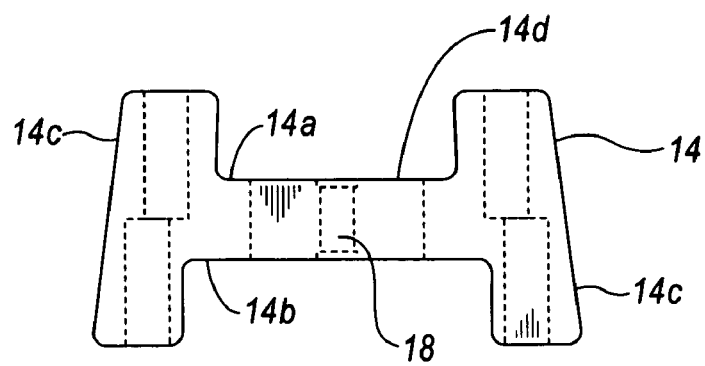
FIG. 5 is an end view of the front template of the door operating hardware installation guide of FIG. 1.
Figure 6:
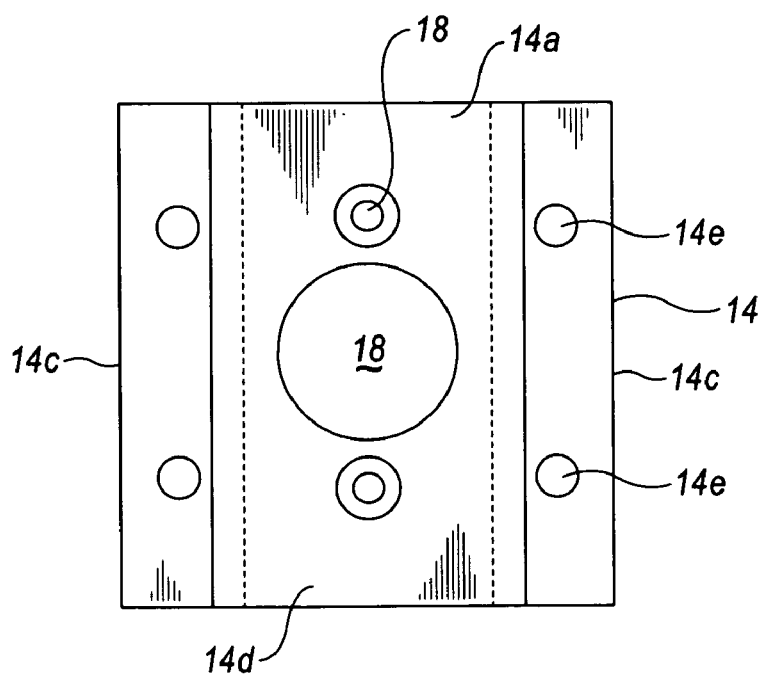
FIG. 6 is a front view of the front template of the door operating hardware installation guide of FIG. 1.
Figure 7:
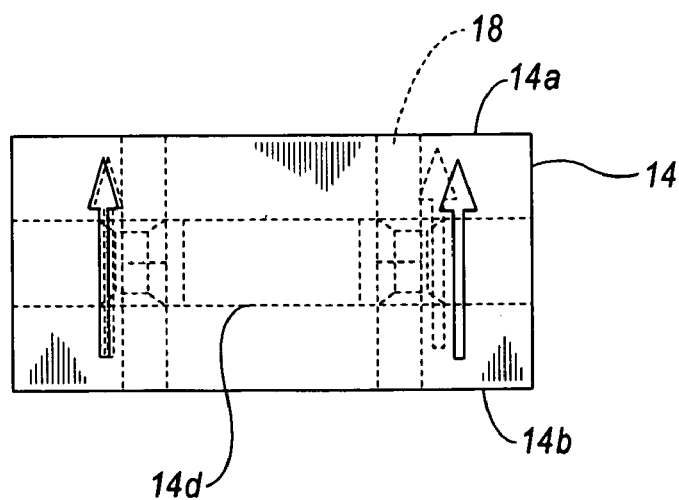
FIG. 7 is a side view of the front template of the door operating hardware installation guide of FIG. 1.

Referring to FIGS. 1, 2 and 5–7, there is shown a front template 14. The front template includes a first side 14a and a second side 14b and edge 14c. In a preferred embodiment, the first side 14a and second side 14b include a recess 14d or slot extending from edge 14c to edge 14c. The width of the recess 14d is sized to receive the edge of the door 12 as shown in FIGS. 1 and 2. It will be appreciated that the width of the recess 14d in each side 14a and 14b may be different and vary to accommodate doors 12 of different thickness. In a preferred embodiment, the width of the recess 14d is such that the side of the recess 14d snugly fit against the sides of the door 12 thereby retaining and fixing the position of the installation guide 10 on the door without aid of any external device or assistance.

Referring to FIGS. 1–4, there is a shown a side template 16. The side template 16 includes a first side 16a and a second side 16b and edge 16c. The side template 16 is operatively, removably coupled to the front template 14. The side template 16 may be removable coupled to the front template by most any suitable interconnecting arrangement to align and fix the side template 16 with respect to the front template 14. In a preferred embodiment, as shown in the figures, the edge 16c of the side template 16 includes a plurality of posts 16d. The posts 16d are configured to be received within complimentary openings 14e formed within the front template 14 to removably fix the side template 16 with respect to the front template in a general L-shape configuration. It will be appreciated that the present invention is not limited to the use of a single side template 16 in combination with a front template 14. For example, a side template 16 may be removably fixed on each side of the recess 14d of the front template 14 to form a general U-shape configuration.

In a preferred embodiment, opposing edges 16c of the side template 16 each include a pair of posts 16d and the first side 14a and the second side 14b of the front template 14 each include a complimentary pair of openings 14e on each side of the recess 14d. It will be appreciated that either edge 16c of the side template 16 may be removably fixed adjacent each side of the recess 14d in the first side 14a and the second side 14b of the front template 14 thereby providing the flexibility for a variety of different arrangements and combinations of through guide holes 18 for different door 12 requirements as desired.

The installation guide 10 may include markings to visually indicate the specific purpose of each recess 14d or through guide hole 18 and the relative orientation of the front template 14 and side template 16 as desired.

In operation, a side 14a or 14b of the front template 14 is selected having the appropriate size recess 14d to accommodate the specific door 12 width. This recess 14d is then placed against the edge of the door 12. The posts 16d of the side template 16 are the inserted into the openings 14e formed within the front template 14 such that a desired side 16a or 16b of the side template 16 lies in contact with a side of the door 12. The side 16a or 16b of the side template 16 has a predetermined through guide hole 18 positioned as desired to facilitate the drilling of a hole with a hole saw to receive the operating hardware.

The installation guide 10 may be formed of most any suitable material using most any suitable manufacturing techniques knowledgeable to one skilled in the art. For example, the installation guide 10 may be formed through the use of injection molding techniques well known in the art of injection molding, making the installation guide relatively simple to manufacture. For durability, the installation guide 10 may be manufactured from any of several high-quality plastics, and is preferably transparent to facilitate visually locating the guide on the door 12.

The documents, patents and patent applications referred to herein are hereby incorporated by reference.

While the invention has been specifically described in connection with certain specific embodiments thereof, it is to be understood that this is by way of illustration and not of limitation, and the scope of the appended claims should be construed as broadly as the prior art will permit.

What is claimed is:

1. A door operating hardware installation guide for preparing a door for the mounting of operating hardware, the guide comprising:
    a front template having a first side and a second side each including a recess of a different width;
    a side template having a first side and a second side, the side template operatively, removably coupled to the front template;
    the front template and the side template including a plurality of through guide holes defining the outer perimeter of proposed mounting holes for the operating hardware;
    thereby with either the first side or the second side of the front template in contact with the edge of the door and either the first side or the second side of the side template in contact with a side of the door, the accurate placement of the mounting holes in the door is facilitated by the through guide holes.

2. The guide of claim 1 wherein the side template is removably coupled to the front template by an interconnecting arrangement to align and fix the side template with respect to the front template.

3. The guide of claim 2 wherein the interconnecting arrangement includes a plurality of posts extending from an edge of the side template, the posts configured to be received with complimentary openings formed within the front template to removably fix the side template with respect to the front template.

4. The guide of claim 3 wherein the opposing edges of the side template each include a pair of posts.

5. The guide of claim 3 wherein the first side and the second side of the front template each include a pair of openings on each side of the recess therein.

6. The guide of claim 1 wherein the guide includes visual markings.

7. A door operating hardware installation guide for preparing a door for the mounting of operating hardware, the guide comprising:
    a front template having a first side and a second side each including a recess of a different width;
    a side template having a first side and a second side, the side template operatively, removably coupled to the front template by an interconnecting arrangement to align and fix the side template with respect to the front template; and
    the front template and the side template including a plurality of through guide holes defining the outer perimeter of proposed mounting holes for the operating hardware.

8. The guide of claim 7 wherein the side template includes a pair of posts.

9. The guide of claim 8 wherein the first side and the second side of the front template each include a pair of openings on each side of the recess, wherein the posts are configured to be received within the open to removably fix the side template with respect to the front template.

10. A door operating hardware installation guide for preparing a door for the mounting of operating hardware, the guide comprising:
    a front template having a first side and a second side;
    a side template having a first side and a second side, the side template operatively, removably coupled to the front template by an interconnecting arrangement including a pair of posts extending from opposing edges of the side template, the posts configured to be received with complimentary openings formed within the front template to align and removably fix the side template with respect to the front template;
    the front template and the side template including a plurality of through guide holes defining the outer perimeter of proposed mounting holes for the operating hardware;
    thereby with either the first side or the second side of the front template in contact with the edge of the door and either the first side or the second side of the side template in contact with a side of the door, the accurate placement of the mounting holes in the door is facilitated by the through guide holes.

* * * * *